US008086103B2

(12) United States Patent
Beacken et al.

(10) Patent No.: US 8,086,103 B2
(45) Date of Patent: Dec. 27, 2011

(54) METHODS AND APPARATUS FOR COMMUNICATING DYNAMIC OPTICAL WAVEBANDS (DOWBS)

(75) Inventors: Marc J. Beacken, Randolph Township, Morris County, NJ (US); Dominick J. Imbesi, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 1401 days.

(21) Appl. No.: 10/835,086

(22) Filed: Apr. 29, 2004

(65) Prior Publication Data
US 2005/0244157 A1 Nov. 3, 2005

(51) Int. Cl.
*H04L 12/28* (2006.01)
*H04B 10/16* (2006.01)

(52) U.S. Cl. .............................. 398/69; 398/70; 398/71

(58) Field of Classification Search .............. 398/45–57, 398/75, 69–73, 95, 66
See application file for complete search history.

(56) References Cited

U.S. PATENT DOCUMENTS

| 5,136,599 | A | * | 8/1992 | Wilcox ........................... 372/26 |
| 5,335,104 | A | * | 8/1994 | Johnson ........................ 398/31 |
| 5,351,146 | A | * | 9/1994 | Chan et al. ..................... 398/58 |
| 5,436,748 | A | * | 7/1995 | Vinel et al. ..................... 398/72 |
| 5,528,582 | A | * | 6/1996 | Bodeep et al. ................. 370/276 |
| 5,734,486 | A | * | 3/1998 | Guillemot et al. .............. 398/54 |
| 5,793,871 | A | * | 8/1998 | Jackson ......................... 380/54 |
| 5,822,102 | A | * | 10/1998 | Bodeep et al. ................. 398/69 |
| 5,864,672 | A | * | 1/1999 | Bodeep et al. ................. 725/126 |
| 6,449,073 | B1 | * | 9/2002 | Huber ............................ 398/82 |
| 6,504,638 | B1 | * | 1/2003 | Tanaka et al. .................. 398/97 |
| 6,519,062 | B1 | * | 2/2003 | Yoo ................................ 398/49 |
| 6,532,099 | B2 | * | 3/2003 | Fuse ............................ 359/278 |
| 6,619,865 | B1 | * | 9/2003 | Takai et al. .................... 398/68 |
| 6,768,827 | B2 | * | 7/2004 | Yoo ................................ 385/14 |
| 6,788,727 | B2 | * | 9/2004 | Liu ............................... 372/102 |
| 6,792,208 | B1 | * | 9/2004 | Mukherjee et al. ............. 398/52 |
| 6,810,211 | B1 | * | 10/2004 | Castanon ...................... 398/47 |
| 6,940,863 | B2 | * | 9/2005 | Xue et al. ...................... 370/401 |
| 6,944,406 | B1 | * | 9/2005 | Way .............................. 398/196 |

(Continued)

OTHER PUBLICATIONS

Weik, "Fiber Optics Standard Dictionary, Third edition", pp. 694 and p. 629. 1997.*

*Primary Examiner* — Danny Leung
(74) *Attorney, Agent, or Firm* — Ryan, Mason & Lewis, LLP

(57) ABSTRACT

Dynamic optical wavebands are disclosed that allow a plurality of user streams having a common destination node to be positioned in a substantially adjacent non-overlapping manner on a spectrum for treatment as a routable entity. Each waveband has an associated center wavelength and spectral extent. The plurality of user streams can optionally be encrypted using a corresponding cipher. Wavebands that are received by a network node are filtered so that individual wavebands can be isolated, if necessary. For example, individual wavebands can be switched to an appropriate output node for forwarding in the optical network. In addition, the center wavelength and spectral extent of a waveband can be converted, if necessary, to position the waveband substantially spectrally adjacent to another waveband sharing a common path portion. In this manner, the substantially spectrally adjacent wavebands can be treated as an aggregated waveband for the common portion of a path. The disclosed wavebands can be processed only as an optical signal. The center wavelength, spectral extent and routing information associated with each waveband can optionally be processed as out-of-band signals.

29 Claims, 3 Drawing Sheets

U.S. PATENT DOCUMENTS

| | | | |
|---|---|---|---|
| 6,954,593 B1* | 10/2005 | Fuse | 398/154 |
| 7,088,922 B2* | 8/2006 | Tomofuji et al. | 398/95 |
| 7,099,529 B2* | 8/2006 | Wang et al. | 385/24 |
| 7,106,967 B2* | 9/2006 | Handelman | 398/47 |
| 7,130,540 B2* | 10/2006 | Simmons et al. | 398/49 |
| 7,203,422 B2* | 4/2007 | Kani et al. | 398/72 |
| 7,236,708 B2* | 6/2007 | Shimada et al. | 398/141 |
| 7,283,748 B2* | 10/2007 | Jung et al. | 398/72 |
| 7,310,481 B2* | 12/2007 | Park et al. | 398/72 |
| 7,317,875 B2* | 1/2008 | Moriwaki et al. | 398/87 |
| 7,386,236 B1* | 6/2008 | Kuo et al. | 398/99 |
| 7,398,020 B2* | 7/2008 | Song et al. | 398/71 |
| 7,418,204 B2* | 8/2008 | Jung et al. | 398/68 |
| 2001/0030785 A1* | 10/2001 | Pangrac et al. | 359/125 |
| 2002/0015552 A1* | 2/2002 | Link et al. | 385/24 |
| 2002/0145775 A1* | 10/2002 | Effenberger et al. | 359/123 |
| 2002/0181081 A1* | 12/2002 | Myers et al. | 359/341.1 |
| 2002/0191247 A1* | 12/2002 | Lu et al. | 359/124 |
| 2002/0191250 A1* | 12/2002 | Graves et al. | 359/128 |
| 2003/0206740 A1* | 11/2003 | Lee et al. | 398/79 |
| 2004/0105675 A1* | 6/2004 | Beacken | 398/49 |
| 2004/0126057 A1* | 7/2004 | Yoo | 385/16 |
| 2004/0228629 A1* | 11/2004 | Harris et al. | 398/79 |
| 2005/0002671 A1* | 1/2005 | Smith et al. | 398/83 |
| 2005/0089027 A1* | 4/2005 | Colton | 370/380 |
| 2005/0111844 A1* | 5/2005 | Compton et al. | 398/70 |
| 2005/0244157 A1* | 11/2005 | Beacken et al. | 398/58 |
| 2006/0153564 A1* | 7/2006 | Ryu et al. | 398/69 |

* cited by examiner

METHODS AND APPARATUS FOR COMMUNICATING DYNAMIC OPTICAL WAVEBANDS (DOWBS)

FIELD OF THE INVENTION

The present invention relates to optical communication networks and, more particularly, to optical devices for routing multi-wavelength optical signals.

BACKGROUND OF THE INVENTION

Optical communication systems increasingly employ wavelength division multiplexing (WDM) techniques to transmit multiple information signals on the same fiber, and differentiate each user sub-channel by modulating a unique wavelength of light. WDM techniques are being used to meet the increasing demands for improved speed and bandwidth in optical transmission applications. In optical communication networks, such as those employing WDM techniques, individual optical signals are often selectively routed to different destinations. Thus, a high capacity matrix or cross-connect switch is often employed to selectively route signals through interconnected nodes in a communication network.

Optical switches typically allocate an entire wavelength to each packet in order to permit wavelength selective routing. Wavelengths that can be exploited for optical communications, however, are finite in number and expensive to provision. Thus, an entire wavelength is a rather large granularity for resource allocation in an optical communication system. U.S. patent application Ser. No. 10/306,935, entitled "Optical Packet Tray Router," discloses an optical packet tray router that aggregates one or more packets in a packet tray for transmission over a network. The packet trays provide a mechanism for switching at the wavelength level. The packet trays carry one or more packets through an optical communication system and represent the routable entity with a finer grain size than wavelength circuit switched systems, since each packet tray can be dynamically, in time and space, assigned a unique wavelength.

While the packet trays provide an efficient mechanism for switching optical signals at the wavelength level, challenges remain for effectively mapping user information onto network resources using state-of-the-art nodal technology. For high rate, long-lived, flows of information, the packetization process and the packet switching process further increases nodal real-time and routing complexity. A need therefore exists for methods and apparatus for optical communications that provide freedom from packetization in the time dimension and freedom from adherence to a defined wavelength grid, such as the International Telecommunication Union (ITU) grid, in the wavelength dimension.

SUMMARY OF THE INVENTION

Generally, dynamic optical wavebands are disclosed that provide freedom from mapping the user information into packets of a particular format and size in the time dimension and freedom from adherence to a defined wavelength grid, as the associated supported bandwidths or bit rates, in the wavelength dimension. According to one aspect of the invention, a plurality of user streams having a common destination node are positioned in a substantially adjacent non-overlapping manner on a spectrum to form a waveband. The waveband has an associated center wavelength and spectral extent and can be injected for routing in an optical network. From nodal element to nodal element, the wavebands may be disaggregated, aggregated or swapped, in order to achieve the desired routing to the destination. The plurality of user streams can optionally be encrypted using a corresponding cipher.

According to another aspect of the invention, wavebands that are received by a network node are filtered so that individual wavebands can be isolated, if necessary. For example, individual wavebands can be switched to an appropriate output node for forwarding in the optical network. In addition, the center wavelength and spectral extent of a waveband can be converted, if necessary, to position the waveband substantially spectrally adjacent to another waveband sharing a common routing path portion. In this manner, the substantially spectrally adjacent wavebands can be treated as an aggregated waveband for the common portion of a routed path.

The disclosed wavebands can be processed solely in the optical domain. The routing information associated with each waveband can optionally be processed as an out-of-band signal. Likewise, the center wavelength and spectral extent control information associated with each waveband can optionally be processed as an out-of-band signal.

A more complete understanding of the present invention, as well as further features and advantages of the present invention, will be obtained by reference to the following detailed description and drawings.

DETAILED DESCRIPTION

The present invention provides an optical communication system that aggregates one or more user streams in a waveband for optical transmission over a network 220. The present invention recognizes that wavelengths are finite in number and expensive to provision. Thus, an entire wavelength is a rather large granularity for resource allocation in an optical communication system. The wavebands of the present invention provide a mechanism for adapting network capacity to user demands. The disclosed wavebands carry one or more user streams through an optical communication system and represent the routable entity.

The Dynamic Optical Wave-Band (DOWB) networks of the present invention do not employ a preconceived wavelength grid structure upon which a fixed allocation of bandwidth resources rest. Furthermore, there is no required minimum quanta of switching or routing within the network. Rather, the network resource allocation and unit of routing adapts to the signal characteristics itself, and the natural aggregation of such signals for transport within the network. Thus, the disclosed DOWB principles accommodate dynamic network traffic, support variable data rates, are protocol agnostic, and characterize the signal traffic transport by their bandwidth and fidelity requirements. For applications requiring a high degree of information assurance, multiple encrypted streams may be transported concurrently, without intermediate decrypt-encrypt steps. Effectively, virtual private networks may be established, dynamically, on the behalf of users.

The disclosed DOWB techniques may be applied in fiber based or fiber-less optical communications systems. In addition, the disclosed DOWB techniques may use out-of-band control methods, such as Generalized Multi-Protocol Label Switching (GMPLS), and as such fosters transition to DOWB and enables seamless integration of present methods together with DOWB.

Figure 1:
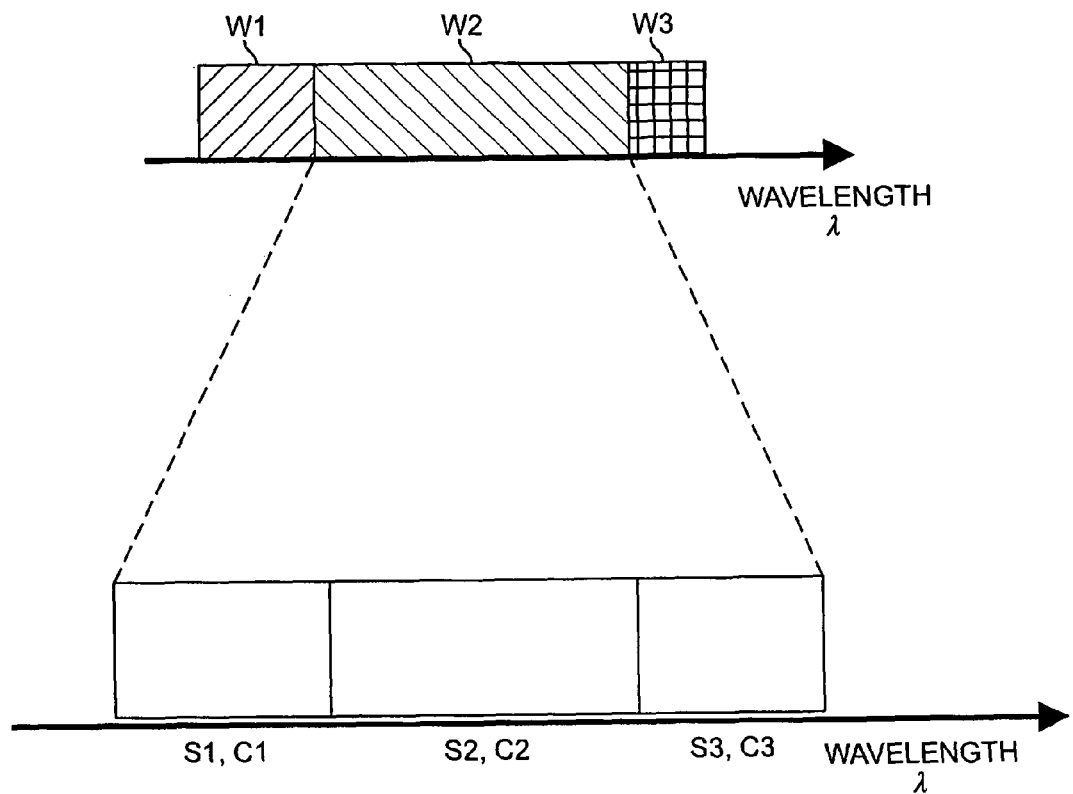
FIG. 1 illustrates a spectrum of interest as a function of wavelength, $\lambda$.

FIG. 1 illustrates a spectrum of interest as a function of wavelength, $\lambda$. As shown in FIG. 1, the information bearing spectrum is broken, for example, into three exemplary wavebands W1, W2 and W3, each containing an aggregation of one or more user payloads of interest. A given waveband provides a variable bandwidth, referred to herein as a spectral extent, centered about some wavelength, referred to herein as a center wavelength, that contains a flow of interest and is routed as an entity. The size of each waveband is variable and is determined by the bandwidth needs of the aggregated user payloads. The center wavelength and spectral extent of a given waveband, as well as the necessary routing information, can be transmitted with the waveband using out-of-band signaling techniques.

The lower portion of FIG. 1 illustrates the spectrum associated with waveband W2 in further detail. It is noted that the exemplary waveband W2, itself injected into the network as an aggregation of three users, is comprised of three distinct user signals, S1, S2 and S3, each associated with a corresponding user U1, U2 and U3. The user signals S1, S2 and S3 are optionally encrypted for information assurance by distinct ciphers C1, C2 and C3, respectively, and contained within a finite spectral extent within waveband W2. Thus, a waveband, such as the waveband W2, may be comprised of multiple encrypted streams, such as the streams S1, S2 and S3 from one or more users.

Thus, according to one aspect of the invention, user signals, such as the signals S1, S2 and S3, that have the same nodal destination can be combined into a single waveband, such as the waveband W2. At each node, the entire W2 waveband is routed as a steerable unit. Each waveband, such as the waveband W2, is decomposed into the constituent user signals S1, S2 and S3 only at the edge node associated with the destination of the user signals. The network utilization is enhanced by having the network adapt to the signal waveband needs.

According to a further aspect of the invention, wavebands, such as the wavebands W1, W2 and W3 of FIG. 1, that share a common path for at least a portion of the route between a source node and a destination node can be collocated on the spectrum (i.e., placed in non-overlapping substantially adjacent positions in the spectrum) and treated as a routable entity for the common path portion. Wavebands that are collocated along a common path will maintain their individual center wavelength and spectral extent, and the group of aggregated wavebands will have an aggregated center wavelength and spectral extent so that the group of aggregated wavebands can be treated as a routable entity along the common path.

Figure 2:
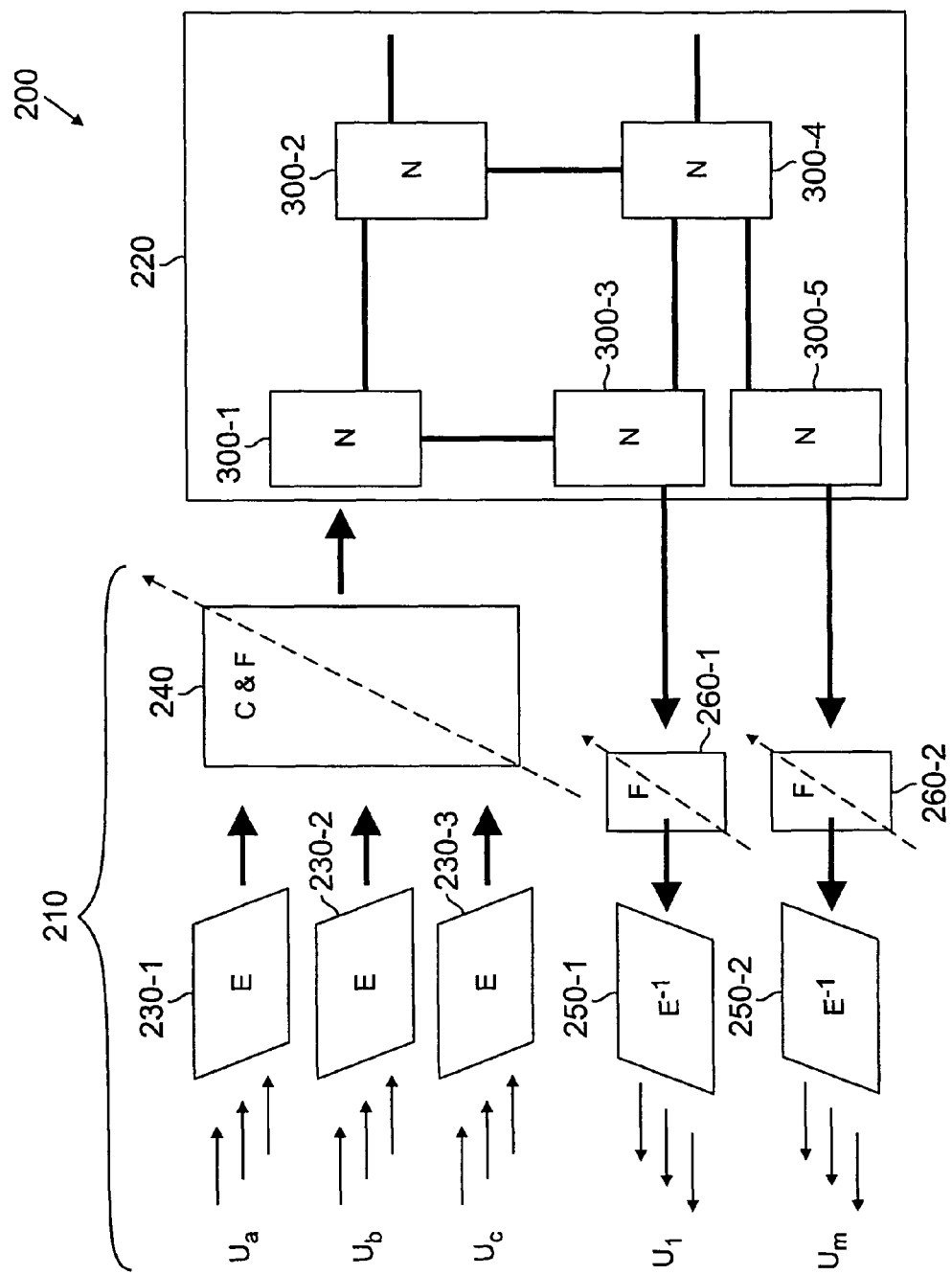
FIG. 2 illustrates an exemplary network environment in which the present invention can be employed.

FIG. 2 illustrates an exemplary network environment 200 in which the present invention can be employed. As shown in FIG. 2, the exemplary network environment 200 is comprised of a network access portion 210 and a Dynamic Optical Wave-Band network 220. Distinct Users are identified in FIG. 2 as "$U_i$." Without loss of generality, users can be considered as both candidate sources, such as users $Ua_i$ through $U_b$, and destinations such as users $U_1$ and $U_m$. Hence, the Dynamic Optical Wave-Band network 220 supports either symmetrical or asymmetrical information flows.

The signals from each user source, $U_i$, such as the signals S1, S2 and S3 from FIG. 1, are optionally encrypted by corresponding ciphers, C1, C2, C3, each associated with a corresponding encryption system (E) 230-$i$. The encrypted signals are applied to a variable combining and filtering ("C&F") stage 240.

The network input is dynamic. In particular, various users $U_i$ appear and disappear, and the data rate is variable. In addition, each user $U_i$ may require different levels of security (encryption level) or access to different levels of information. In one exemplary implementation, the distinct ciphers C1, C2 and C3 can provide increasing levels of security or information. For example, cipher C1 may be associated with a fuzzy image, cipher C2 may provide a first upgrade to the fuzzy image, and cipher C3 may provide an even higher resolution image.

At the C&F stage 240, each bandlimited, encrypted signal S is combined in a spectrally non-overlapping manner forming a waveband, such as the waveband W2 of FIG. 1, for transport within the Dynamic Optical Wave-Band network 220. As discussed further below in conjunction with FIG. 2, the Dynamic Optical Wave-Band network 220 is comprised of a plurality of network nodes 300-1 through 300-N. Upon exit of the DOWB network 220, the waveband is filtered at stage 260 to yield the signal(s) of interest by specification of a center wavelength and spectral extent. As previously indicated, the center wavelength, spectral extent and routing information associated with a given waveband can be provided in the corresponding out-of-band control information.

As discussed further below in conjunction with FIG. 4, wavebands are processed at each node in the DOWB network 220 in a manner to transport the signal of interest from source to destination. Network topologies are unconstrained, and may be "mesh-oriented," "ring-oriented," or any arbitrary inter-nodal connection topology.

Figure 3:
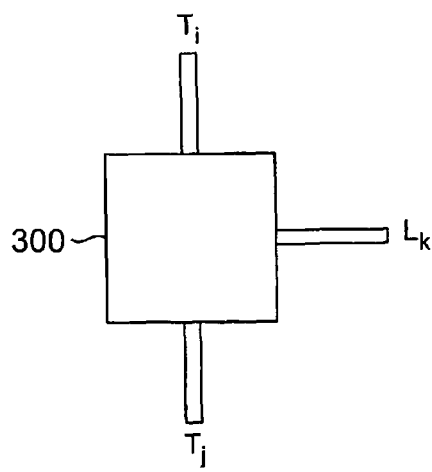
FIG. 3 schematically illustrates an exemplary node of the Dynamic Optical Wave-Band network of FIG. 2.

FIG. 3 schematically illustrates an exemplary node 300 of the Dynamic Optical Wave-Band network 220. As shown in FIG. 3, each node 300 can be considered a three port device, having one or more input ports $T_i$, one or more output ports $T_j$, and one or more add/drop channels $L_k$. A given node 300 may employ various nodal architectures including, but not limited to, configurations that support add-drop systems with high capacity trunks and lower capacity "local loops," fully symmetric N-Port switching and routing, and all combinations and subsets thereof.

The notations T and L are used in FIG. 3 to emphasize that the actual interface capacity may be heterogeneous and hence allow applications of DOWB to full N-Port switch applications, add-drop application, or combinations or subsets thereof.

A node 300 in accordance with the present invention, such as a router or switch, provides space and wavelength selection in order to route each waveband to the appropriate destination. The nodes 300 provide space selection by switching a waveband received on one of N input channels to an appropriate output channel based on the associated out of band signal information. The nodes 300 provide wavelength selection using wavelength division multiplexing techniques to transmit a number of information signals on the same channel.

The Dynamic Optical Wave-Band network 220 provides an optical data path, such that only optical signals are processed, and conversion between optical and electrical signals is not required. As discussed further below in conjunction with FIG. 4, the DOWB approach of the present invention allows for waveband steering (switching and/or routing) using existing all optical technology. Such technologies include, but are not limited to Bragg gratings, micro-electrical mechanical switching (MEMS), Semiconductor Optical Amplifiers (SOAs), Silicon Optical Bench techniques (SiOB), non-linear optical processing, such as four wave mixing and others, and photonic interferometers.

Figure 4:
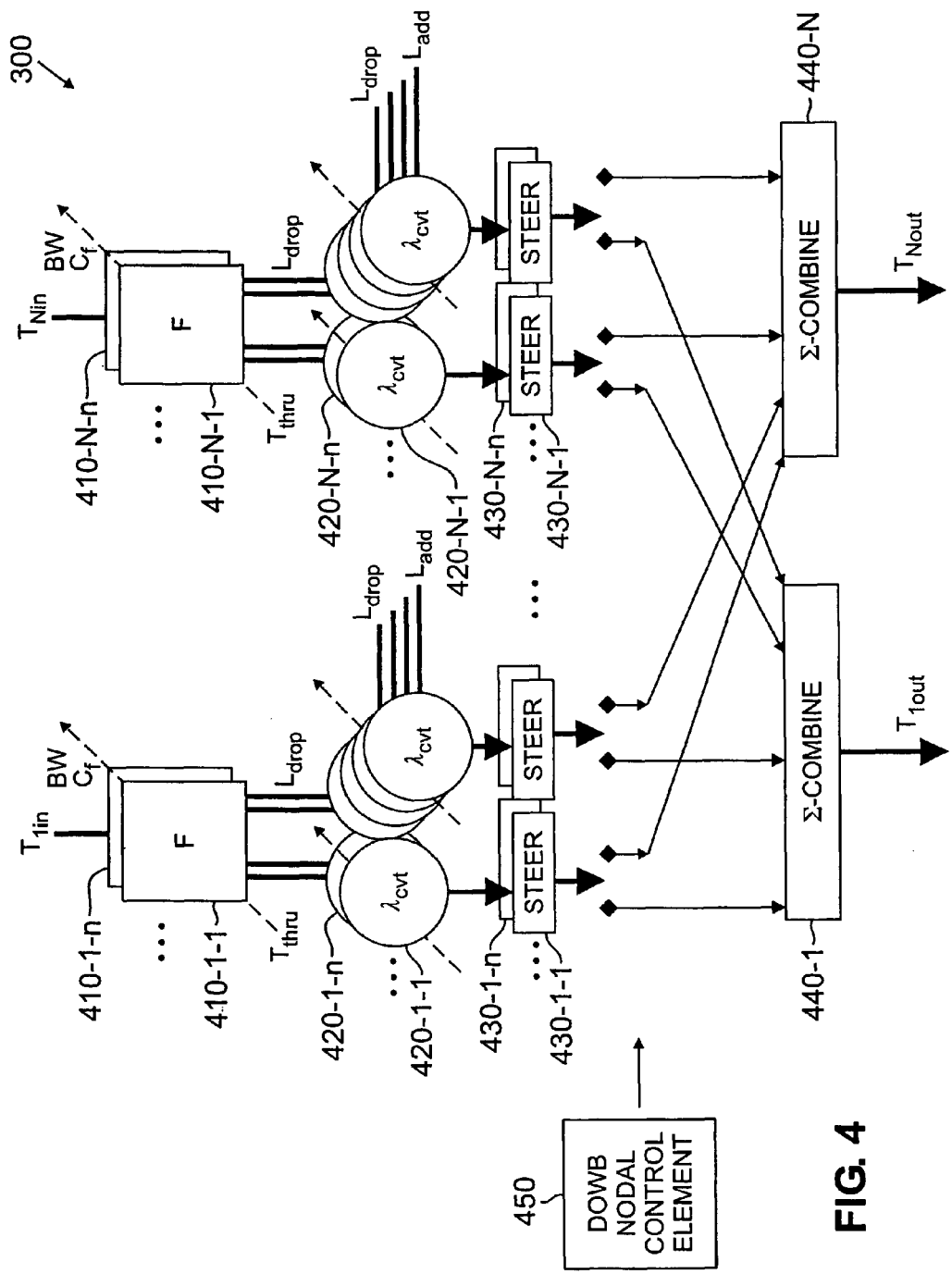
FIG. 4 is a schematic block diagram of an exemplary node of the Dynamic Optical Wave-Band network in further detail.

FIG. 4 is a schematic block diagram of an exemplary node 300 of the Dynamic Optical Wave-Band network 220 in further detail. The exemplary architecture shown in FIG. 4 depicts general waveband processing. As discussed hereinafter, the waveband processing performed by the node 300 of FIG. 4 includes selection, add-drop, swap, spectrum management, steering, and aggregation. The order of the processing in a node 300 can be driven by the photonic technology employed. Various functions may be aggregated using novel optical devices. For specific network applications, selected functions may be eliminated if the associated capability is not needed.

As shown in FIG. 4, the exemplary node 300 includes a plurality of input trunk interfaces, $T_{1in}$ through $T_{Nin}$, and a plurality of output trunk interfaces, $T_{1out}$ through $T_{Nout}$. In addition, the exemplary node 300 includes a number of optional "local loop" interfaces, designated as "L," with "add" or "drop" subscripts identifying the direction of the interface.

Each input trunk interface has a corresponding filterbank, such as the filters 410-1-1 through 410-1-n associated with input trunk interface $T_{1in}$, that performs a waveband select function. Each filter 410 has an associated center wavelength, $C_f$, and spectral extent (i.e., bandwidth) BW, and can thereby isolate a given waveband of interest (or aggregated collection of wavebands). Generally, each filter 410 isolates each waveband or aggregated collection of wavebands that needs to be processed differently by the node 300. The center wavelength, $C_f$, and spectral extent, BW, for a given filter 410 are obtained from a nodal control element 450, discussed below, that processes the out-of-band control information associated with each waveband. For example, the wavebands received on each input trunk $T_{in}$, are filtered by the filters 410 to separate the wavebands that will be passed through the node 300, from those that are to be dropped by the node 300 (i.e., those wavebands that have a local destination).

Each filter 410 may be implemented, for example, as a tunable optical filter characterized by a dynamically set center wavelength and finite spectral extent (e.g., bandwidth). Functionally, each tunable optical filter is a three-port functional device in order to enable the passing of a set of contiguous wavebands while dropping another continuous set of wavebands. Parallel functional devices (shown in the depth dimension) process replicates of the input, T, to enable the passing and dropping of multiple non-contiguous wavebands. The parallel structures provide additional degrees of freedom to implement highly efficient packing of wavebands for transport within the DOWB network 220. Similarly, reduction of the number of parallel structures, and hence a reduction in the degrees of freedom may be accommodated by multi-stage processing across multiple network nodes, thereby reducing the overall network complexity. However, a packing efficiency loss may be the tradeoff required for this case.

At the output of the filter stage 410, the wavebands that will be passed through the node 300 are provided to a set of $T_{thru}$ interfaces and those that are to be dropped by the node 300 are provided to a set of local loop drop $L_{drop}$ interfaces. Following the filter stage 410, the wavebands that will be passed through the node 300 are provided to a first set of wavelength converters, 420-1-1 through 420-1-n associated with thru trunk interfaces $T_{thru}$. Similarly, the wavebands that are to be dropped by the node 300 are provided to a second set of wavelength converters associated with the local loop. The wavelength converters, such as the wavelength converters 420, each alter the wavelength of a given waveband (or aggregated collection of wavebands), if necessary, to collocate wavebands that share a common path portion on the spectrum, so that they can be treated as a routable entity along the common path portion.

For example, each waveband that is to be passed through the node 300 appears on a thru trunk, $T_{thru}$, and may have its associated center wavelength, $C_f$, and spectral extent, BW, translated, if necessary, to a new associated center wavelength, $C_f$, and spectral extent, BW, by a corresponding wavelength converter 420-1-1 through 420-1-n. The wavelength converters 420 perform waveband add/drop for the local loop, as well as spectral swapping and management. Spectral management includes the combination of wavebands with common routing into an aggregated collection of wavebands.

As a matter of maintaining signal integrity, processing may be incorporated into the optical signal flow to provide signal waveform or timing restoration (or both). In some implementations, wavelength conversion and signal restoration may be accomplished in a signal processing step. The local loop, L, signals may be similarly processed to accomplish the desired spectrum management scheme for each outbound T and L interface.

The center wavelength, $C_f$, and spectral extent, BW, for a given wavelength converter 420 are obtained from the nodal control element 450, discussed below, that processes the out-of-band control information associated with each waveband. The wavelength converters 420 may be implemented in accordance with the wavelength conversion techniques described, for example, in U.S. patent application Ser. No. 10/306,935, entitled "Optical Packet Tray Router," incorporated by reference herein.

After the wavelength conversion function 420, the wavebands are steered to the correct output port, $T_{out}$, of the node 300 at a waveband steering stage 430 (spatial switching). For example, each waveband that is to be passed through the node 300, is steered to the correct output port, $T_{out}$, by a corresponding waveband steer 430-1-1 through 430-1-n. Again, the nodal control element 450 processes the out-of-band control information associated with each waveband to identify the appropriate output port $T_{out}$ for a waveband to the steer 430.

Finally, at each output port, $T_{out}$, such as the output port, $T_{1out}$, a corresponding combiner 440-1 through 440-N combines non-overlapping adjacent wavebands for transmission to the next node 300 in the Dynamic Optical Wave-Band network 220. This concluding waveband aggregation step enables the synthesis of contiguous wavebands for transport to adjacent nodes.

In the notation of FIG. 4, various components of the node 300 that adapt to the wavebands of interests are indicated using diagonal arrowed-dashed lines (associated, for example, with the filter stage 410 and wavelength converter stage 420) indicating dynamic variability of the associated function. The DOWB Nodal Control Element (NCE) 450 establishes the nodal adaptation settings as a result of the out-of-band signaling processes (not shown). Thus, the nodal control element 450 provides the routing intelligence. As previously indicated, the out of band signalling information may implement Generalized Multi-Protocol Label Switching techniques. The out of band signalling information arrives simultaneous with each waveband.

The center wavelength and spectral extent portion of the out-of-band signaling information associated with a given waveband are used by the nodal control element 450 to properly configure the filters 410, so that each filter can isolate those wavebands or aggregated collection of wavebands that need to be separately processed by the node 300. In addition, the routing information portion of the out-of-band signaling information associated with a given waveband is used by the nodal control element 450 to properly configure the wavelength converters 420 to perform waveband add/drop for the local loop, as well as spectral swapping so the wavebands with common routing can be aggregated into a collection of wavebands and treated as a routable entity for the common path portion. The routing information portion of the out-of-band signaling information associated with a given waveband is also used by the nodal control element 450 to properly configure the steering stage 430 so that wavebands and aggregated wavebands are provided to the appropriate output port $T_{out}$ that provides a path towards the destination.

According to one aspect of the invention, tunable all-optical processing adapts to the wavebands of interests, rather than forcing an externally imposed grid or fixed allocation scheme and all of such a scheme's associated processing complexity. This scheme is memory-less, avoiding a challenging aspect of all optical packet networks. Further, limited network nodal operations combined with the granularity of a Dynamic Optical Waveband facilitate reduced network node implementation complexity. This reduces the cost of network implementation and allows for the implementation of small, low power, lightweight network nodes for applications including, but not limited to terrestrial ad-hoc networks and airborne/spaced based optical wireless networks.

Dynamic Optical Waveband streams in accordance with the present invention can be treated and steered independently, regardless of the content (i.e., payload) of a given waveband. Thus, a single DOWB-based network can provide both packet and circuit switched services. In addition, user input to the network can be either analog or digital with changing protocols and data rates.

For unattended network operations, or networks of very large scale, small physical nodal size, volume, weight and power is of importance. For operation in extreme environments, inherently parallel optical system implementations may have enhanced reliability in comparison with their large scale electronic counterparts. The DOWB approach is highly favorable with respect to these desired attributes.

It is to be understood that the embodiments and variations shown and described herein are merely illustrative of the principles of this invention and that various modifications may be implemented by those skilled in the art without departing from the scope and spirit of the invention.

We claim:

1. A method performed by a node in an optical network, comprising:
   receiving a plurality of user streams having a common destination node, wherein said plurality of user streams have respective spectral extents that are independently variable, wherein said destination node is distinct from said node; and
   positioning said plurality of user streams in a substantially adjacent non-overlapping manner on a spectrum to form a waveband, wherein said waveband has an associated variable center wavelength and variable spectral extent and can be routed as an entity to a next node in said optical network, wherein said variable center wavelength and said variable spectral extent are not based on fixed wavelength grid intervals.

2. The method of claim 1, further comprising the step of modifying said associated center wavelength based on routing information for said waveband.

3. The method of claim 1, wherein said waveband is processed only as an optical signal.

4. The method of claim 1, wherein routing information associated with said waveband is processed as an out-of-band signal.

5. The method of claim 1, wherein said center wavelength and spectral extent associated with said waveband are processed as an out-of-band signal.

6. The method of claim 1, further comprising the step of switching said waveband to an appropriate output port based on associated routing information.

7. The method of claim 1, further comprising the step of encrypting each of said plurality of user streams using a corresponding cipher.

8. A node in an optical network, comprising:
   a plurality of input ports for receiving a plurality of user streams having a common destination node, wherein said plurality of user streams have respective spectral extents that are independently variable, wherein said destination node is distinct from said node; and
   one or more wavelength converters for positioning said plurality of user streams in a substantially adjacent non-overlapping manner on a spectrum to form a waveband, wherein said waveband has an associated variable center wavelength and variable spectral extent and can be routed as an entity to a next node in said optical network, wherein said variable center wavelength and said variable spectral extent are not based on fixed wavelength grid intervals.

9. The node of claim 8, wherein said one or more wavelength converters is further configured to modify said associated center wavelength based on routing information for said waveband.

10. The node of claim 8, wherein said waveband is processed only as an optical signal.

11. The node of claim 8, wherein routing information associated with said waveband is processed as an out-of-band signal.

12. The node of claim 8, wherein said center wavelength and spectral extent associated with said waveband are processed as an out-of-band signal.

13. The node of claim 8, further comprising a steering stage to switch said waveband to an appropriate output port based on associated routing information.

14. The node of claim 8, further comprising an encryption stage to encrypt each of said plurality of user streams using a corresponding cipher.

15. A method performed by a node in an optical network, comprising:
   filtering one or more received wavebands, each of said one or more received wavebands having a variable center wavelength and variable spectral extent and wherein said one or more received wavebands are comprised of a plurality of user streams having a common destination node and respective spectral extents that are independently variable, wherein said variable center wavelength and said variable spectral extent are not based on fixed wavelength grid intervals, wherein said destination node is distinct from said node;
   switching each of said one or more received wavebands to an appropriate output node for forwarding in said optical network.

16. The method of claim 15, further comprising the step of converting said center wavelength and spectral extent of at least one received waveband to position said at least one received waveband substantially spectrally adjacent to another waveband sharing a common path portion.

17. The method of claim 15, wherein said one or more received wavebands is processed only as an optical signal.

18. The method of claim 15, wherein routing information associated with each of said one or more received wavebands is processed as an out-of-band signal.

19. The method of claim 15, wherein said center wavelength and spectral extent associated with each of said one or more received wavebands are processed as an out-of-band signal.

20. The method of claim 15, wherein at least one of said one or more received wavebands is an aggregation of wavebands sharing a common path portion.

21. A node in an optical network, comprising:
one or more filters for separating a plurality of wavebands received on the same port, each of said wavebands having a variable center wavelength and variable spectral extent and wherein said one or more received wavebands are comprised of a plurality of user streams having a common destination node and respective spectral extents that are independently variable, wherein said variable center wavelength and said variable spectral extent are not based on fixed wavelength grid intervals, wherein said destination node is distinct from said node;
a steering section to provide said wavebands to an appropriate output node for forwarding in said optical network.

22. The node of claim 21, further comprising a wavelength converter for converting said center wavelength and spectral extent of at least one waveband to position said at least one waveband substantially spectrally adjacent to another waveband sharing a common path portion.

23. The node of claim 21, wherein said waveband is an aggregation of wavebands sharing a common path portion.

24. The node of claim 21, wherein each of said plurality of wavebands is processed only as an optical signal.

25. The node of claim 21, wherein routing information associated with each of said plurality of wavebands is processed as an out-of-band signal.

26. The node of claim 21, wherein said center wavelength and spectral extent associated with each of said plurality of wavebands is processed as an out-of-band signal.

27. The method of claim 1, further comprising the step of filtering a received signal to select one or more of said wavebands based on a tuning of at least one of said associated variable center wavelength and variable spectral extent.

28. The node of claim 8, further comprising one or more filters for filtering a received signal to select one or more of said wavebands based on a tuning of at least one of said associated variable center wavelength and variable spectral extent.

29. The method of claim 15, further comprising the step of filtering a received signal to select one or more of said wavebands based on a tuning of at least one of said associated variable center wavelength and variable spectral extent.

* * * * *